United States Patent [19]
Hattori

[11] Patent Number: 5,602,900
[45] Date of Patent: Feb. 11, 1997

[54] RADIO TELECOMMUNICATION APPARATUS

[75] Inventor: Kiyoshi Hattori, Tokyo, Japan

[73] Assignee: Kabushiki Kaisha Toshiba, Kawasaki, Japan

[21] Appl. No.: 297,412

[22] Filed: Aug. 29, 1994

Related U.S. Application Data

[63] Continuation of Ser. No. 642,635, Sep. 17, 1991, abandoned.

[30] Foreign Application Priority Data

Jan. 18, 1990 [JP] Japan ......................... 2-8811

[51] Int. Cl.$^6$ ....................................... H04Q 7/20
[52] U.S. Cl. ................... 379/58; 379/59; 379/61; 379/63
[58] Field of Search ................... 379/58, 59, 61, 379/62, 67, 88, 212; 455/67.7, 33.1, 54.1

[56] References Cited

U.S. PATENT DOCUMENTS

| | | |
|---|---|---|
| 4,718,080 | 1/1988 | Serrano et al. . |
| 4,939,766 | 7/1990 | Umemoto et al. ................... 379/61 X |
| 4,945,570 | 7/1990 | Gerson et al. ......................... 379/61 X |
| 5,233,641 | 8/1993 | Maeda ........................................ 379/58 |

FOREIGN PATENT DOCUMENTS

| | | |
|---|---|---|
| 0310433 | 4/1989 | European Pat. Off. . |
| 2537683 | 3/1977 | Germany . |

*Primary Examiner*—Curtis Kuntz
*Assistant Examiner*—G. J. Oehling
*Attorney, Agent, or Firm*—Banner & Witcoff, Ltd.

[57] ABSTRACT

The cellular mobile telephone apparatus comprises a radio unit having an antenna, and a telephone unit which is connected to the radio unit via a line and is formed of a main unit and handset. To originate a call, a user dials the telephone number of an other party to be called. When the dialing is detected, a calling tone indicating to the user that the call being originated is generated from a speaker of the telephone unit. To start speech communication, it is necessary to designate and capture a speech channel in the radio channel. When the capture of the designated speech channel is detected, the calling tone is stopped. After the communication, there are three types of terminating the call. At the end of communication, the type of the termination is detected and the corresponding synthesized voice message is generated.

25 Claims, 5 Drawing Sheets

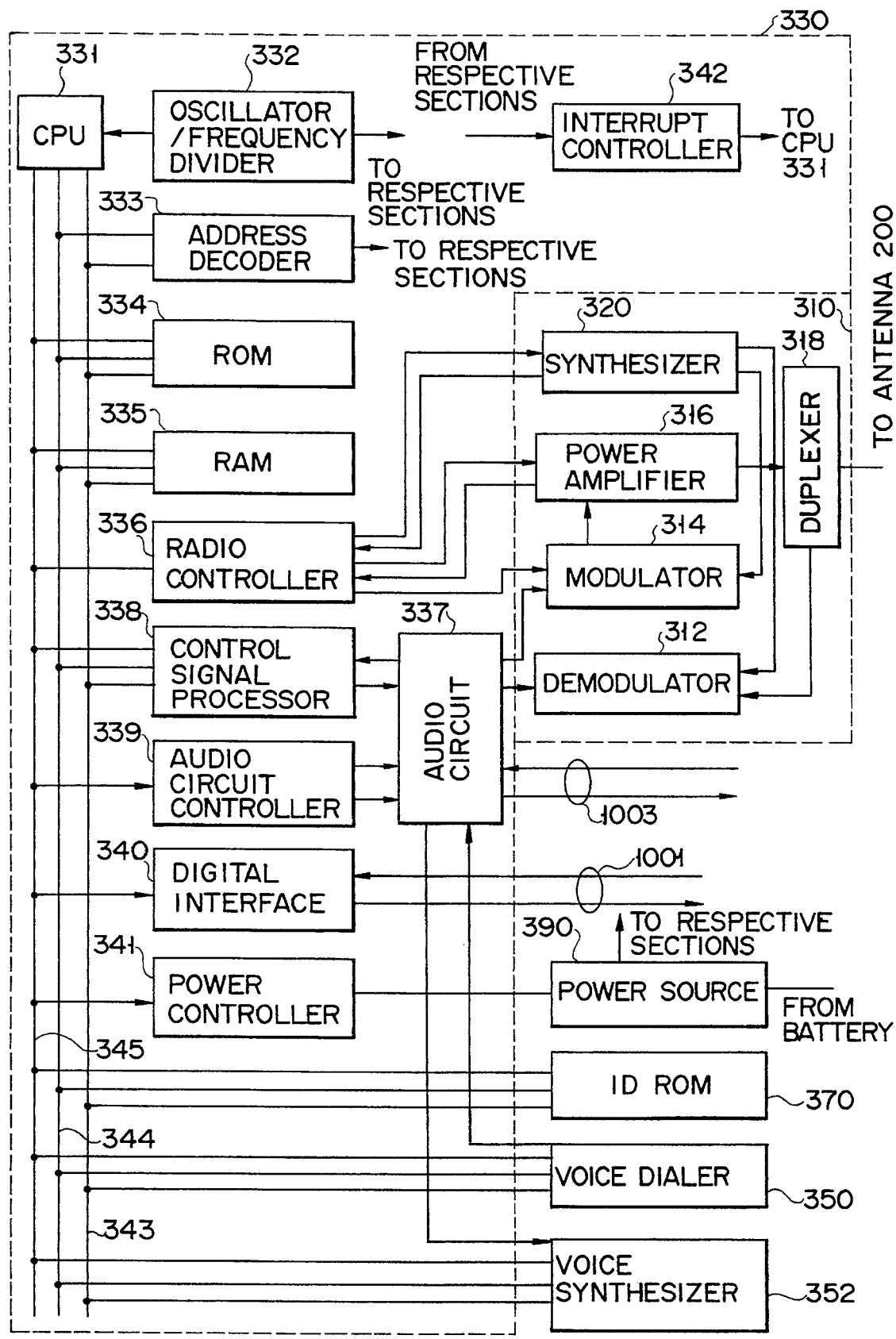
F I G. 2

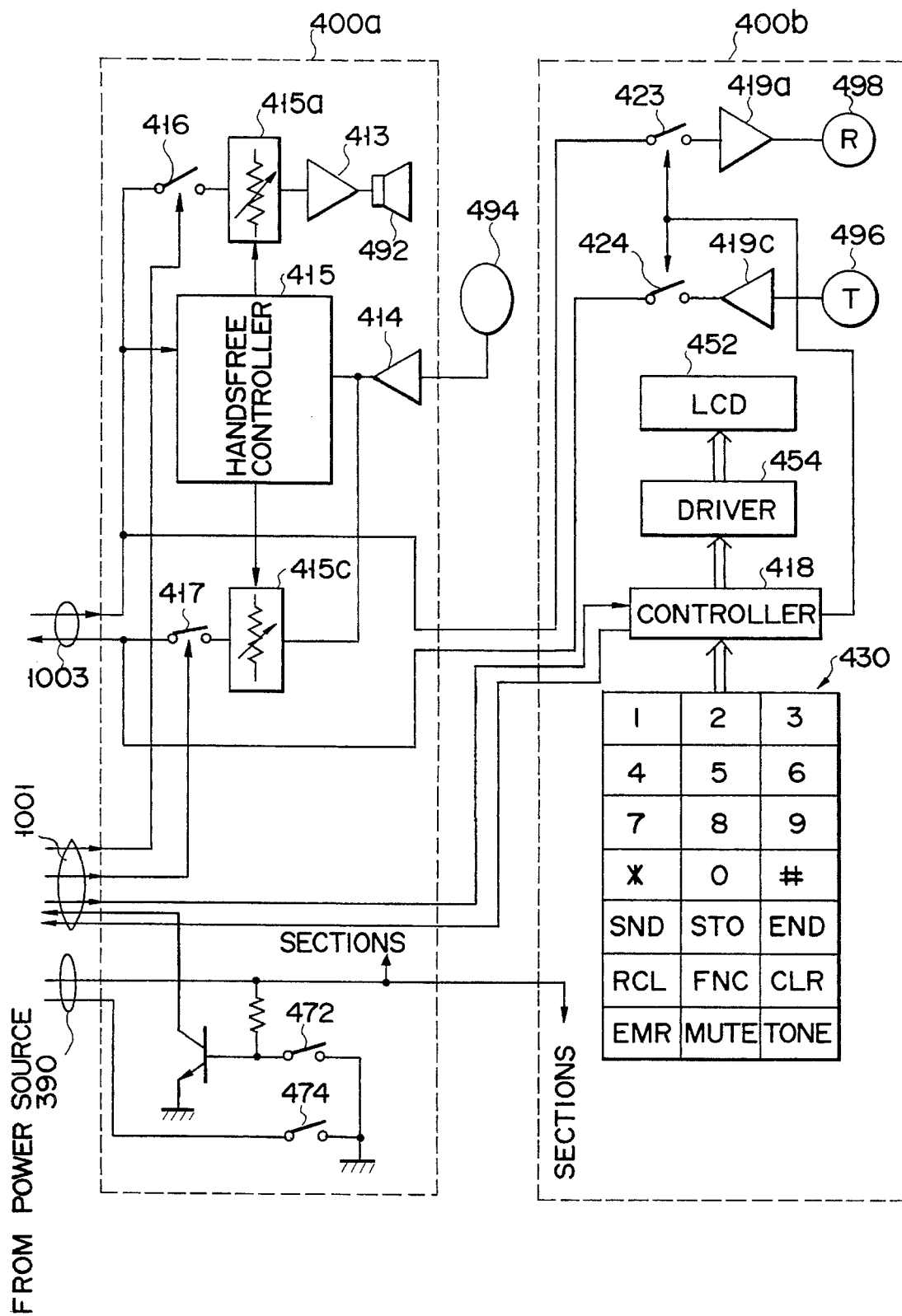
F I G. 3

RADIO TELECOMMUNICATION APPARATUS

This application is a continuation of application Ser. No. 07/642,635, filed Jan. 17, 1991 abandoned.

BACKGROUND OF THE INVENTION

1. Field of the Invention

The present invention relates to the field of radio telecommunication apparatus used in a radio telecommunication system, and more particularly to a radio telephone apparatus such as a cellular mobile telephone apparatus.

2. Description of the Related Art

In the radio telecommunication apparatus such as a cellular mobile telephone apparatus (hereinafter simply called mobile telephone apparatus), a reception phone is generally silent when the call is originated and the call is terminated. For example, after a telephone number is dialed by the user of the mobile telephone, a reception phone is silent until a speech channel is established between the mobile telephone and a base station. The reception phone is also silent when the call is terminated by the other party or the communication channel line between the base station and the mobile telephone is automatically disconnected due to a trouble of an associated radio channel resulting from, for example, a fading.

It is difficult, from the human sense, to distinguish such a silent period from a silent period during the actual speech communication, which is occurred when the other party of the communication does not utter a sound. Thus, the user of the mobile telephone may carelessly get out of the automobile even while a speech communication link has been established. In this case, the other party feels unpleasant. Alternately, the user may forget the termination processing to release the communication link. This leads to an increase of communication fee.

Further, if the reception phone is silent for a period of time during the speech communication, the user of the mobile telephone would sometimes wonder whether or not the other party terminates the communication and then he or she off-hooks the handset. In this case, the other party also feels unpleasant.

In order to prevent such a mistake, a communication indicator lamp is provided with the conventional mobile telephone, which is turned on upon a depression of a calling start key and off upon the disconnection of the speech communication. However, since this indicator is turned on after the calling start key is depressed, it is not possible for the user to recognize whether or not the speech communication link is established. Further, since the visual indication is performed, the user must intentionally watch the indicator to ascertain whether or not the channel is connected.

As described above, in the conventional radio telecommunication apparatus, the user is not able to properly grasp the current status of the telecommunication apparatus unless he or she ascertains what is going on the line.

SUMMARY OF THE INVENTION

Accordingly, it is an object of the present invention to provide a radio telecommunication apparatus which enables the user to ascertain whether or not a channel is captured and thereby to grasp the current status of the apparatus.

According to the present invention, there is provided a radio telecommunication apparatus connected to a base station via a radio channel, comprising first detection means for detecting a start of call origination to the base station via the radio channel, second detection means for detecting a start of communication with a telecommunication apparatus of another party via the base station, first indicating means, connected to the first and second detection means, for indicating that the call origination is carried out, indication being started upon detection of the first detection means and terminated upon detection of the second detection means, third detection means for detecting a termination of the call and a reason for the termination of the call, and second indicating means, connected to the third detection means, for indicating the reason for the termination of the call.

According to the present invention, the user is able to properly and readily grasp the current status of the telecommunication apparatus without ascertaining what is going on the line.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a detailed block diagram showing a radio unit of the mobile telephone apparatus shown in FIG. 1;

FIG. 3 is a detailed block diagram showing a telephone unit of the mobile telephone apparatus shown in FIG. 1;

DETAILED DESCRIPTION OF THE PREFERRED EMBODIMENTS

Figure 1:
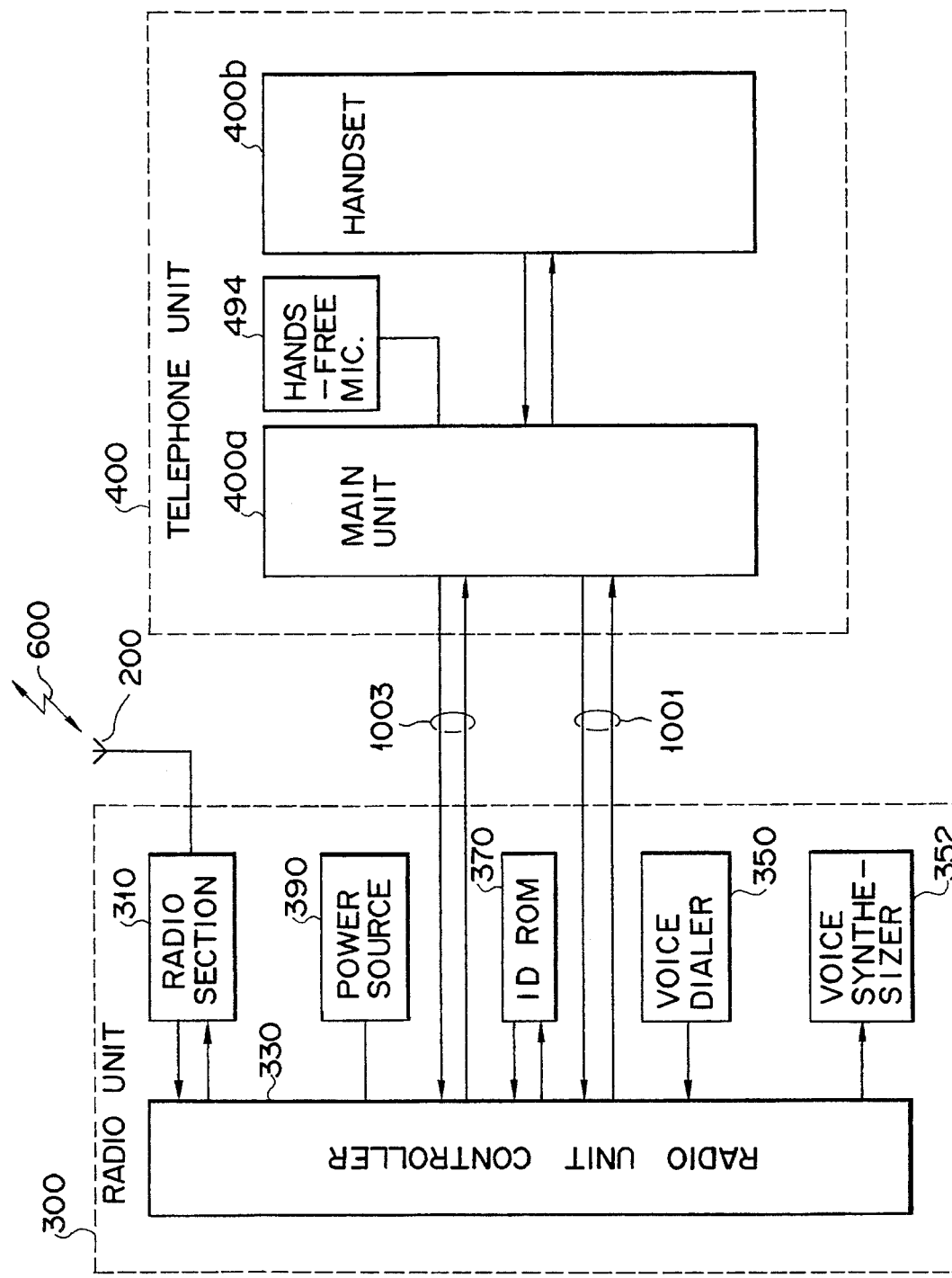
FIG. 1 is a block diagram showing a whole arrangement of a cellular mobile telephone apparatus according to an embodiment of the present invention.

A preferred embodiment of a radio telecommunication apparatus according to the present invention will now be described with reference to the accompanying drawings. FIG. 1 is a block diagram showing a whole arrangement of a cellular mobile telephone apparatus according to an embodiment of the present invention. The mobile telephone apparatus of this embodiment is formed of an antenna 200, a radio unit 300, and a telephone unit 400. The antenna 200 is mounted on an outer body surface of an automobile (not shown). The radio unit 300 is provided within the trunk of the automobile. The telephone set 400 is formed of a main unit 400a and a handset 400b and is mounted near a driver's seat inside the automobile.

In general mobile telephone systems, a geographical area is covered and served by breaking the area into a plurality of small zones or cells. A large land area can be covered by a plurality of connected cells areas. A mobile telephone switching office is provided for each area and is connected to a plurality of base stations, each covering a cell within the area.

The radio unit 300 comprises a radio section 310 for establishing a radio channel 600 between the antenna 200 and the base stations through the antenna 200, a radio unit controller 330 for controlling the overall operations of the apparatus, a voice dialer 350 for speech recognition in order to generate the dial number signal based on the speech of the user, a voice synthesizer 352 for synthesizing a speech to provide various voice information, an ID ROM 370 formed of an EEPROM for storing a system identification (ID) number, and a power source 390 for supplying power from a battery mounted in the automobile to the respective components of the apparatus.

The details of the radio unit 300 is shown in FIG. 2. The radio section 310 comprises a demodulator 312, a modulator 314, a power amplifier 316, a duplexer 318, and a synthesizer 320. The demodulator 312 demodulates a radio signal which is transmitted from the base station to be received via the radio channel 600, antenna 200, and duplexer 318. It should be noted that this radio signal includes an audio sound signal, a control signal, and so on. The modulator 314 modulates an audio signal and a control signal which are output from the radio unit controller 330 and generates a radio signal to be transmitted via the power amplifier 316, duplexer 318, antenna 200, and radio channel 600.

The power amplifier 316 amplifies the transmission signal which is output from the modulator 314. The amplification factor of the power amplifier 316 may be continuously varied or varied in a step-wise manner, e.g., 8-step variable. The duplexer 318 supplies the reception signal which is received through the radio channel 600 and antenna 200 to the demodulator 312 and the transmission signal from the modulator 314 and power amplifier 316 to the antenna 200.

The synthesizer 320 is formed of a channel selection local oscillator and specifies a frequency from which signals are demodulated by the demodulator 312 and a frequency to which signals are modulated by the modulator 314. For example, 666 channels can be selected by the synthesizer 320.

The radio unit controller 330 comprises a central processing unit (CPU) 331, an oscillator/frequency divider 332, an address decoder 333, a ROM 334, a RAM 335, a radio controller 336, an audio circuit 337, a control signal processor 338, an audio circuit controller 339, a digital interface 340, a power controller 341, and an interrupt controller 342. The CPU 331 is connected to these components through a data bus 343, an address bus 344, and a control bus 345, both of which are formed of 8-bit bus lines.

The CPU 331 controls the whole operation of the radio unit controller 330. The oscillator/frequency divider 332 supplies clocks to the CPU 331 and frequency-divides the clocks in order to supply appropriate frequency-divided pulses as timing pulses to respective sections of the telephone apparatus requiring them.

The address decoder 333 outputs a predetermined operation signals response to the control signal from the CPU 331. The ROM 334 stores various programs required for operation of the CPU 331 therein. The RAM 335 stores various types of data during processing for use by the CPU 331.

The radio controller 336 controls the radio section 310 in response to instructions from the CPU 331. For example, the radio controller 336 sends a signal indicative of available frequencies to the synthesizer 320, a signal indicative of an amplification factor to the power amplifier 316, and a signal indicative of the modulation parameters to the modulator 314. In order to prevent an erroneous operation, the radio controller 336 receives, for example, a step-out signal from the synthesizer 320 and an output power detection signal from the power amplifier 316 and sends them to the CPU 331.

The audio circuit 337 extracts a control signal and an audio signal from the received signals demodulated by the demodulator 312 and supplies the control signal to the control signal processor 338, the audio signal to the voice synthesizer 350, and the audio signal to the telephone unit 400 via an audio line 1003. The audio circuit 337 also supplies a control signal from the control signal processor 338, an audio signal from the voice dialer 350, and an audio signal from the telephone unit 400 via the audio line 1003 to the demodulator 314. It should be noted that the audio circuit 337 also shapes the waveform of the control signal to be sent to the control signal processor 338 in a particular signal format and filters the control signal to be supplied to the modulator 314.

The control signal processor 338 performs bit and word synchronizations with respect to the control signal supplied from audio circuit 337. Maintaining the required synchronization, the control signal processor 338 converts the serial control signals, including control data received from the base station, into parallel control data signals. The processor 338 further converts the parallel control data signals to be transmitted to the base station into serial control signals. The control signal is sent to and received from the base station via the audio circuit 337.

The audio circuit controller 339 performs various control regarding to the audio circuit 337. Under the control of the audio circuit controller 399, for example, the audio circuit 337 supplies the received signal from the demodulator 312 to the control signal processor 338, voice dialer 350, or telephone unit 400 and enables either of a signal which is output from the control signal processor 338, voice dialer 350, or telephone set 400 to be selectively supplied to the audio circuit 337.

The digital interface 340 interfaces the data communication between the radio unit 300 and the telephone unit 400 via a control line 1001. The power controller 341 controls the power source 390 and sets a voltage which is supplied from the battery of the automobile to the power source 390 to a predetermined level. The voltage having the predetermined level is supplied to the respective circuit components of the whole telephone apparatus.

Responsive to an interrupt instruction from the respective circuit components, the interruption controller 342 makes an interruption to CPU 331 to start various control operations.

The details of the telephone unit 400 is shown in FIG. 3. The telephone unit 400 is formed of a main unit 400a, hands-free microphone 494, and handset 400b. The main unit 400a comprises amplifiers 413 and 414, a hands-free controller 415, attenuators 415a and 415c, switches 416 and 417, a speaker 492, a hook switch 472, and an on/off switch 474.

The amplifier 413 amplifies a speech signal which is supplied from the audio circuit 337 in the radio unit 300 via the audio line 1003, switch 416, and attenuator 415a and sends the amplified speech signal to the speaker 492. The amplifier 414 amplifiers a speech signal, which is input from the hands-free microphone 494, and sends it to the audio circuit 337 through the attenuator 415c, switch 417, and audio line 1003 as well as to the hands-free controller 415.

The hands-free circuit 415 prevent howling resulting from an acoustic coupling between the speech signal (transmission speech) input from the hands-free microphone 494 and the speech signal (reception speech) output from the speaker 492. The switch 416 is used for switching of whether or not the transmission speech signal which is sent from the audio circuit 337 is output from the speaker 492. The switch 417 is used for switching of whether or not the reception speech signal which is input from the hands-free microphone 494 is output to the audio circuit 337. The switching of the switches 416 and 417 is accomplished by the control signal from the digital interface 340 via the control line 1001.

The hook switch 472 detects an on-hook or an off-hook state of the handset 400b. The detected signal is sent to the digital interface 340 in the radio unit 300 via the control line 1001. The on/off switch 474 sets the mobile telephone apparatus of the embodiment in an on-state or off-state and an on-signal is sent to the power source 390 in the radio unit 300.

The handset 400b comprises a controller 418, amplifiers 419a and 419c, switches 423 and 424, a liquid crystal display (LCD) device 452, an LCD driver 454, a key section 430 having a plurality of key pads, a handset microphone 496, and a handset receiver 498.

The controller 418 controls the whole operation of the handset 400b and sends out a control signal coming from the key section 430 to the radio unit controller 330 in the radio unit 300 via the control line 1001 in response to a control signal sent from the radio unit controller 330 via the control line 1001.

The amplifier 419a amplifies a speech signal which is supplied from the audio circuit 337 via the audio line 1003 and the switch 423 and outputs the amplified speech signal to the handset receiver 498. The amplifier 419c amplifies a speech signal which is input from the handset microphone 496 and sends the amplified speech signal to the audio circuit 337 via the switch 424 and audio line 1001.

The switch 423 is used for switching of whether or not a speech signal supplied from the audio circuit 337 is sent to the handset receiver 498. The switch 424 is used for switching of whether or not a speech signal input from the handset microphone 496 is sent to the audio circuit 337. The switching of the switches 423 and 424 is accomplished by the controller 418.

The LCD device 452 is comprised of a multi-digit numeral display section and a display section representative of the various functions. The LCD driver 454 drives the LCD device 452 to effect a predetermined display under the control of the controller 418. The key section 430 comprises, for example, key pads of numerical keys "0" to "9" and function keys "*", "#", "SND", "STO", "END", "RCL", "FNC", "CLR", "EMR", "MUTE", and "TONE". Upon the depression of the key pads, the corresponding key is identified by the controller 418.

The operation of the mobile telephone apparatus of this embodiment will be explained with reference to flowcharts shown in FIGS. 4 and 5.

Figure 4:
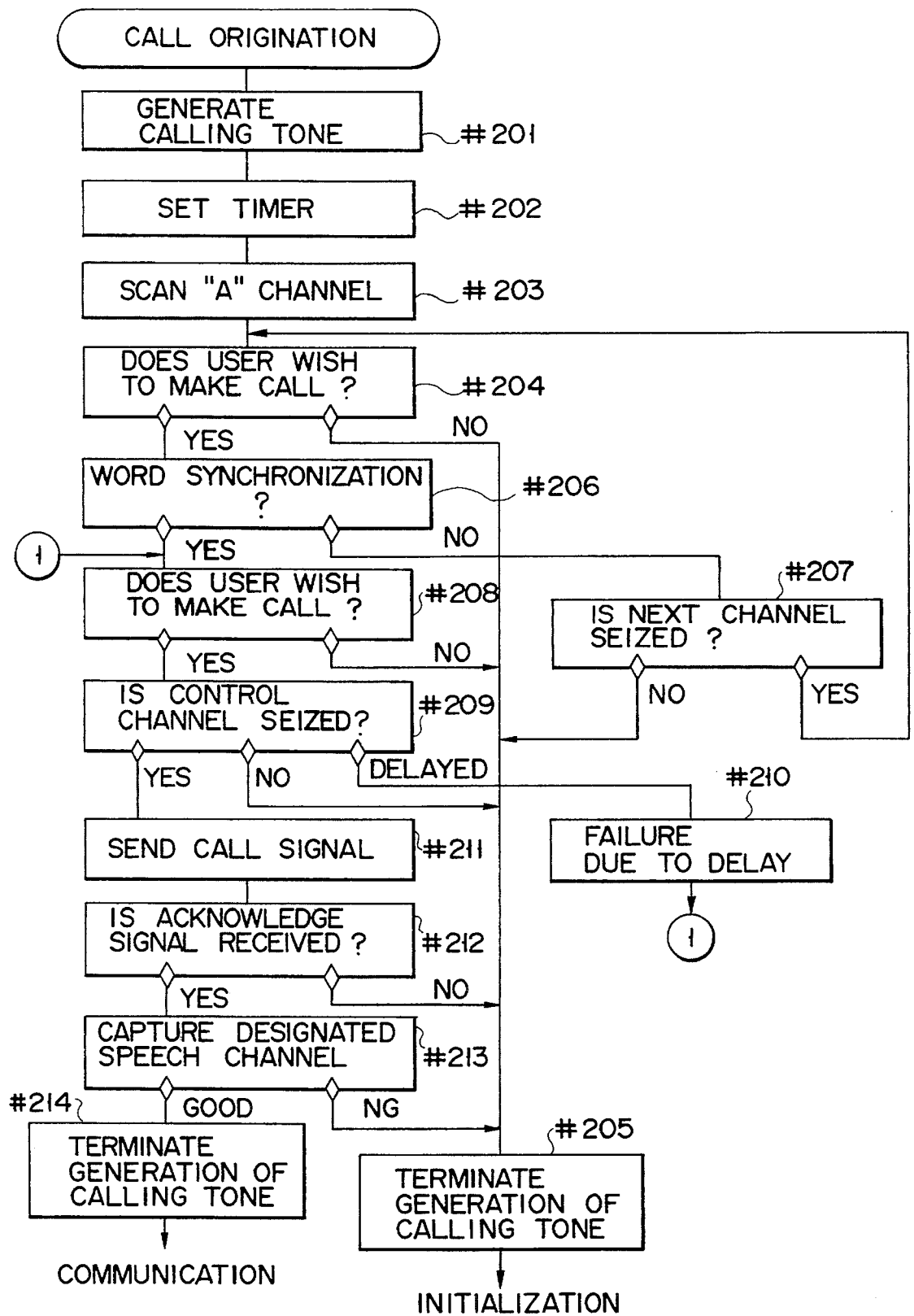
FIG. 4 is a flowchart explaining the call origination operation of the embodiment.

FIG. 4 is a flowchart of an operation of a call origination process. When the user dials the telephone number of the other party to be called by means of the key section 430 or voice dialer 350, the interrupt controller 342 makes the CPU 331 to start the flowchart of FIG. 4. In the case of on-hook call origination, the user dials the telephone number of the other party by means of the key section 430 while the handset 400b is kept on the main unit 400a. The dialed telephone number is displayed on the LCD 452 for confirmation. If it is found that the wrong number is dialed, the user depresses the "CLR" key. If the number is correct, the user depresses the "SND" key to originate call. The process shown in the flowchart of FIG. 4 starts upon the depression of the "SND" key. In the case of off-hook call origination, the user dials the telephone number of the other party by means of the key section 430 after he or she picks up the handset 400b. After dialing the telephone number, the user depresses the "SND" key to originate call. The process shown in the flowchart of FIG. 4 starts upon the depression of the "SND" key. In the case of originating call by means of the voice dialer 350, the user sounds the name of the other party. The voice dialer 350 recognizes the name of the party and generates the telephone number signal corresponding to the recognized name. The process shown in the flowchart of FIG. 4 starts upon the depression of the "SND" key or a lapse of five seconds from the recognition of the name. In other words, the call is originated upon the earlier one of the depression of "SND" key and a lapse of five seconds from the recognition of the name. In the case of the public radio telephone, the flowchart of FIG. 4 is started upon inserting the coins or prepaid card into the telephone apparatus.

At step #201, a calling tone for indicating that a call origination signal is now to be sent to the base station is generated from the speaker 492 by means of the audio circuit 337. This calling tone is similar to the ring-back tone used in the conventional wire telephone system, which is sent back from the telephone of the other party until he or she off-hooks the telephone. The calling information audio tone can be replaced with a dual tone multi-frequency (DTMF) tone or a synthesized speech message. Then, a timer for counting a call reception time is set at step #202. The set time is, for example, 12 seconds.

Then, at step #203, the audio circuit controller 339 in the radio unit controller 330 causes the demodulator 314 to scan each predetermined "A" control channels to obtain reception electric field intensity information of the respective control channels. The channel having the strongest electric field intensity is selected from these control channels and the apparatus 10 is set to receive signals through the control channel having the strongest intensity. In this case, information indicative of the control channel having the second strongest electric field intensity is also obtained.

In general, the radio channels include speech channels for allowing a speech communication, and control channels comprising a "D" channel, "P" channel, and "A" channel. The "D" channel allows system information to be transmitted from the base station to the mobile telephone apparatus. The mobile telephone apparatus is initialized by the system information contained in the "D" channel. The "P" channel allows the system information and call originated response signal representing that the other party off-hooks the telephone to be transmitted from the base station to the mobile telephone apparatus. The "A" channel allows the system information and speech channel designation signal from the base station to the mobile telephone apparatus and a call origination signal from the mobile telephone apparatus to the base station.

It is determined at step #204 whether or not the user wishes to make a call to the other party by means of an origination flag which is set when the handset controller 418 detects the depression of the "SND" key after the user dials the telephone number of the other party. When the handset controller 418 detects the depression of the "SND" key, the controller 418 sends a detection signal to the CPU 331 in the radio unit controller 330. Responsive to the detection signal, a call origination flag in the CPU 331 is set at a logic "1." In this case, it can be determined that the user wishes to make a call. The origination flag is reset upon the depression of the "END" key. Therefore, even if the user dials a wrong number, it is determined that the user does not wish to make a call if he or she depress the "END" key after dialing the telephone number of the other party. If it is determined that the user does not wish to make a call at step #204, the generation of the calling tone is terminated at step #205 and then the initialization of each part of the apparatus is resumed.

If it is determined that the user wishes to make a call at step #204, the control signal processor 338 performs bit and word synchronization operations of the currently received control channel at step #206. That is, word synchronization thereof to obtain system information from this control channel. If the word synchronization is not established, the control channel having the second strongest intensity is seized at step #207, and the same operation is performed at step #204 and step #206. If the control channel having the second strongest intensity is not seized at step #207, the generation of the calling tone is terminated at step #205 and then the initialization of each part of the apparatus is resumed.

After the word synchronization is established, it is again determined at step #208 whether or not the user wishes to make a call to the other party. As described above, if the call origination flag is set at logic "1," it can be determined that the user wishes to make a call. However, if the call origination flag is set at logic "0," it is determined that the user does not wish to make a call and the generation of the calling tone is terminated at step #205 and then the initialization of each part of the apparatus is resumed.

If it is determined at step #208 that the user wishes to make a call, it is determined at step #209 that the selected control channel is appropriate for the origination signal to be broadcasted by analyzing the system information signal from the base station. Upon the selection of an appropriate control channel, a channel selection flag in the CPU 331 is changed from logic "0" to logic "1." However, if any appropriate control channel is not selected, the generation of the calling tone is terminated at step #205 without changing the contents of the channel selection flag and then the initialization of each part of the apparatus is resumed. If the selection of an appropriate control channel is delayed as shown in step #210, it is again determined at step #208 whether or not the user wishes to make a call.

If it is determined at step #209 that an appropriate control channel for broadcast of a call origination signal is selected, the call origination signal including the telephone number of the other party to be called, which is dialed by the user, is transmitted over this control channel at step #211.

After the call origination signal is transmitted, it is determined at step #212 whether or not the acknowledge signal from the base station has been received. The base station calls the other party on the basis of the telephone number included in the call origination signal. If it is determined that the acknowledge signal has been received, a communication radio channel may be established between the mobile telephone apparatus and the called telephone apparatus at step #213. Otherwise, the generation of the calling tone is terminated at step #205 and then the initialization of each part of the apparatus is resumed.

If the communication channel is established between the mobile telephone apparatus and the called telephone apparatus, the generation of the calling tone is terminated at step #214 and then the communication starts. The calling tone may be stopped at a time when the called party off-hooks the handset so that he or she starts to talk.

According to the call origination operation of this embodiment, the calling tone which informs the user that the call is now originated and is similar to the ring-back tone used in the conventional wire telephone system is generated. Therefore, the user is able to properly grasp the current status of the telecommunication apparatus unless he or she ascertains what is going on the line.

Figure 5:
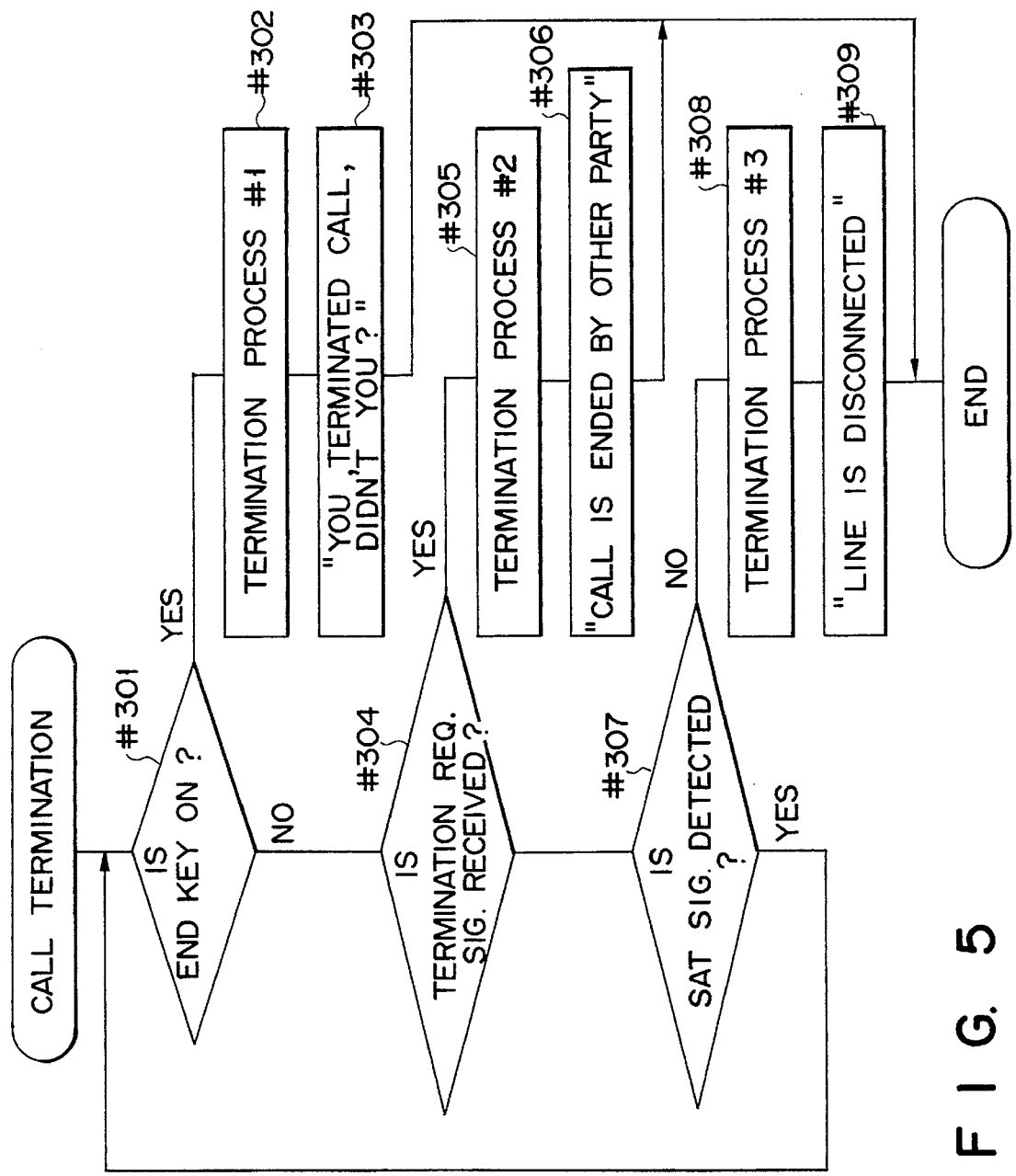
FIG. 5 is a flowchart explaining the call termination operation of the embodiment.

FIG. 5 is a flowchart representing an operation of a call termination process. It is determined at step #301 whether or not the "END" key of the key section 430 is depressed by the user. If it is determined that the "END" key is depressed, the termination of the call by the user is determined and a first predetermined call termination processing operation is carried out at step #302. At step #303, the termination of the call by the user is informed by means of the voice synthesizer 352. A synthesized speech message representing the user's termination of the call, for example, "You terminated the call, didn't you?" is generated from the voice synthesizer 352 and sent through the audio circuit 337 to the speaker 492 where it is output.

If it is not determined that the "END" key is depressed at step #301, it is determined at step #304 whether or not a termination request signal is sent from the base station, which representing that the other party off-hooks the handset or depresses the "END" key. If it is determined that the termination request signal is received, the termination of the call by the other party is determined and a second predetermined call termination processing operation is carried out at step #305. At step #306, the termination of the call by the other party is informed by means of the voice synthesizer 352. A synthesized speech message representing the other party's termination of the call, for example, "The call is terminated by the other party" is generated from the voice synthesizer 352 and sent through the audio circuit 337 to the speaker 492 where it is output.

If it is not determined that the termination request signal is received at step #304, it is determined at step #307 whether or not a supervisory audio tone (SAT) signal is detected. The SAT signal is a tone signal periodically added to the speech signal sent from the base station during the normal communication so as for the base station to monitor the operation of a mobile telephone unit based on a response signal of the SAT signal. Therefore, if the SAT signal is not detected during a predetermined period of time, for example, five seconds, it can be regarded that the communication channel is in a state of difficulty, such as fading, in the sustaining of communication and a third predetermined call termination processing operation is carried out at step #308. At step #309, the termination of the call due to the trouble in the communication channel is informed by means of the voice synthesizer 352. A synthesized speech message representing the trouble of the line, for example, "The line is disconnected" is generated from the voice synthesizer 352 and sent through the audio circuit 337 to the speaker 492 where it is output.

If it is not determined that the termination predetermined period of time, it is again determined at step #301 whether or not the "END" key is depressed by the user.

It may be possible to, prior to the termination processing (step #302, #305, or #308), generation of message (step #303, #306, or #309). In addition to the speech synthesizing tone, a visual message can be provided. The speech message can be replaced by the DTMF tone.

As described above, the call termination is informed by the synthesized voice message denoting the type of the termination, i.e., the reason of termination. Therefore, the user is able to properly grasp the current status of the telecommunication apparatus unless he or she ascertains what is going on the line.

According to this invention, the predetermined calling tone representing the call origination and the predetermined synthesized voice messages are generated at the start and the end of the call, the user knows the current state of talking and distinguishes the no speech period during the call origination and after the call is terminated from a silent period during the actual communication, which occurs when the other party of the communication does not utter a sound.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although an embodiment applied to a mobile telephone apparatus has been described, it is apparent to those skilled in the art that this invention may be easily applied to any kind of radio telecommunication apparatus, such as a transportable type radio telephone or a portable type radio telephone. This invention is also applicable to a cordless telephone system. Furthermore, the concepts of the present invention may be applied to a data transmission apparatus used in a cellular radio telecommunication system.

What is claimed is:

1. A radio telecommunication apparatus connectable to a base station over a radio channel including a control channel and a speech channel, said radio telecommunication apparatus comprising:

first detecting means for detecting an origination of a call to another party, the originated call including a telephone number of the other party use by said base station in calling the other party;

means for establishing a speech channel between said base station and said radio telecommunication apparatus when said base station calls the other party;

second detecting means for detecting the establishment of the speech channel; and first indicating means, connected to said first and second detecting means, for indicating that the origination of the call has been detected by said first detecting means and the establishment of the speech channel has not yet been detected by said second detecting means, wherein the first indicating means begins indicating after the origination of the call and stops indicating after the establishment of the speech channel.

2. The apparatus according to claim 1, wherein said first indicating means comprises means for generating a sound representing a ring-back tone.

3. The apparatus according to claim 1, wherein said first detecting means comprises means for detecting a dialing of a telephone number.

4. The apparatus according to claim 1, further comprising:

third detecting means for detecting a termination of the call and a reason for the termination of the call; and second indicating means, connected to said third detecting means, for indicating the reason for the termination of the call.

5. The apparatus according to claim 4, wherein said third detecting means comprises means for detecting whether or not the user makes a termination operation, means for detecting whether or not the other party makes a termination operation, and means for detecting disconnection of the speech channel.

6. A radio telecommunication apparatus which is connectable to a base station over a radio channel and which communicates with a telecommunication apparatus of another party via said base station, said radio telecommunication apparatus comprising:

detecting means for detecting a termination of communication and a reason for the termination, said detecting means comprising means for detecting whether a user of the radio telecommunication apparatus causes a termination operation, means for detecting whether the other party causes a termination operation, and means for detecting a disconnection of said radio channel; and indicating means, connected to said detecting means, for indicating the reason for the termination.

7. The apparatus according to claim 6, wherein said indicating means comprises means for generating a synthesized voice message expressing the reason for the termination.

8. A method of originating a call from a radio telecommunication apparatus which is connectable to a base station over a radio channel which includes a control channel and a speech channel, the method comprising the steps of:

generating a call origination request with an identification number of a telecommunication apparatus of another party to be called over the control channel;

generating an indication tone upon the generation of the call origination request;

seizing a speech channel in accordance with a channel designation signal which is supplied from the base station; and terminating the generation of the indication tone upon the seizing of the speech channel.

9. The apparatus according to claim 1, wherein said first indicating means comprises means for generating a dual tone multi-frequency tone.

10. The apparatus according to claim 1, wherein said first indicting means comprises means for generating a synthesized speech message.

11. The method according to claim 8, wherein the step of generating an indication tone comprises generating a sound representing a ring-back tone.

12. The method according to claim 8, wherein the step of generating an indication tone comprises generating a dual tone multi-frequency tone.

13. The method according to claim 8, wherein the step of generating an indication tone comprises generating a synthesized speech message.

14. The method according to claim 8, further comprising the steps of:

detecting termination of the call and a reason for termination of the call; and indicating the reason for termination of the call.

15. A method of terminating a call of a radio telecommunication apparatus which is connectable to a base station over a radio channel, the method comprising the steps of:

detecting a termination of the call;

detecting one of a plurality of reasons for the termination of the call, the detecting of one of a plurality of reasons comprising detecting whether a user of the radio telecommunication apparatus causes a termination operation, detecting whether the other party causes a termination operation, or detecting a disconnection of said radio channel; and indicating to a user of said radio telecommunication apparatus which one of the plurality of reasons has been detected as the reason for the termination of the call.

16. The apparatus according to claim 1, wherein said first detecting means detects depression of a SEND key as an origination of a call to said base station over said radio channel.

17. The method according to claim 16, wherein the call origination request is generated when a SEND key is pressed by a user of said radio telecommunication apparatus.

18. The method according to claim 15, wherein the step of indicating comprises indicating which one of the plurality of reasons has been detected as the reason for the termination of the call using a synthesized speech message.

19. A radio telecommunication apparatus connectable to a base station over radio channels including control channels and speech channels, said radio telecommunication apparatus comprising:

supplying means for supplying a telephone number of a party to be called;

transmission initiating means for initiating a transmission process for transmitting a call origination signal including said telephone number to said base station;

first detecting means for detecting the initiation of said transmission process;

seizing means for seizing a control channel;

a transmitter, responsive to said initiating means, for transmitting said call origination signal to said base station over said seized control channel;

establishing means for establishing a speech channel between said base station and said radio telecommunication apparatus based on a speech channel designation signal supplied from said base station;

second detecting means for detecting the establishment of the speech channel; and first indicating means, connected to said first and second detecting means, for indicating that the initiation of the transmission process has been detected by said first detecting means and that the establishment of the speech channel has not yet been detected by said second detecting means, wherein the first indicating means begins indicating after the initiation of the transmission process and before the seizing of the control channel and stops indicating after the establishment of the speech channel and before communication with the other party.

20. The apparatus according to claim 19, wherein said supplying means comprises a keypad for supplying a telephone number of the other party.

21. The apparatus according to claim 19, wherein said supplying means comprises a voice dialer for recognizing a name of the other party and supplying a corresponding telephone number.

22. The apparatus according to claim 19, wherein said transmission initiating means includes a keypad having a SEND key which is actuated by a user of said radio telecommunication apparatus for initiating said transmission process.

23. The apparatus according to claim 19, wherein said transmission initiating means includes a timer for initiating said transmission process a predetermined period of time after the supplying of the telephone number.

24. The apparatus according to claim 19, wherein said first indicating means comprises calling tone generating means for generating a calling tone.

25. The apparatus according to claim 19, wherein said transmission initiating means is responsive to receipt of coins or a money card.

* * * * *

UNITED STATES PATENT AND TRADEMARK OFFICE
CERTIFICATE OF CORRECTION

PATENT NO. : 5,602,900
DATED : February 11, 1997
INVENTOR(S) : Kiyoshi HATTORI

It is certified that error appears in the above-indentified patent and that said Letters Patent is hereby corrected as shown below:

On the title page, section [63] "Related U.S. Application Data", change "Sep. 17, 1991" to --Jan. 17, 1991--.

Signed and Sealed this

Second Day of September, 1997

*Attest:*

*Attesting Officer*

BRUCE LEHMAN

*Commissioner of Patents and Trademarks*